United States Patent Office 3,103,435
Patented Sept. 10, 1963

3,103,435
WELDABLE SINTERED MOLYBDENUM
Charles V. Iredell, Essex Fells, N.J., assignor to Westinghouse Electric Corporation, East Pittsburgh, Pa., a corporation of Pennsylvania
No Drawing. Filed Sept. 9, 1960, Ser. No. 54,822
4 Claims. (Cl. 75—223)

This invention relates to weldable molybdenum and, more particularly, to a method for preparing sintered molybdenum which can be readily welded.

Molybdenum is used in increasing amounts for high temperature applications. For facility of use in such applications, it is necessary to be able to fabricate molybdenum into various structures. In fabricating such structures, it is highly desirable to be able to arc weld molybdenum.

Molybdenum which is processed by the so-called arc-casting process is quite pure and can be arc welded. This arc-cast molybdenum is relatively expensive, however, because of the manner in which it is prepared. Sintered molybdenum is comparatively simple to prepare and inexpensive, but until recently could not readily be welded. In U.S. Patent No. 2,839,819, dated June 24, 1958, to Platte, there is disclosed a weldable sintered molybdenum. This molybdenum is prepared by water mixing titanium metal with molybdenum, forming a compact, and vacuum sintering the compact. Molybdenum is normally sintered in a hydrogen atmosphere and it is simpler and less expensive to hydrogen sinter molybdenum. Dry mixing is also simpler and less expensive than water mixing and powdered titanium metal is quite combustible.

It is the general object of this invention to provide a process for preparing sintered molybdenum which readily can be welded and which sintered molybdenum is simply and inexpensively prepared.

It is another object to provide a simple process for preparing weldable sintered molybdenum, using conventional sintering equipment.

It is a further object to provide specific details for preparing sintered molybdenum which can be arc welded. The aforesaid objects of the invention, and other objects which will become apparent as the description proceeds, are achieved by providing a method for producing sintered molybdenum which is suitable for welding and particularly arc welding. In preparing such molybdenum, there is first formed a substantially even mixture of from 0.03% to 0.4% by weight of finely divided titanium hydride with the balance substantially all finely divided molybdenum powder. Thereafter, the powder mixture is compressed to form a compact and the compact is sintered to ingot form with conventional equipment. The resulting massive molybdenum is mechanically worked into desired shape and the worked material can readily be arc welded to form various molybdenum structures.

In preparing the weldable sintered molybdenum of this invention, finely divided molybdenum powder is first prepared in accordance with conventional practices, such as hydrogen reducing the oxide to metal. This powder is thoroughly mixed with commercially available, finely divided titanium hydride within the range of from 0.03% to 0.4% by weight. The state of division of the hydride and molybdenum is not critical, but as an example, the average particle diameter of both constituents is about 2.7 microns. The preferred titanium hydride addition is about 0.15% by weight and this specific addition will be considered in detail. It is noted that titanium hydride is a stable compound and is simple and safe to handle. As a specific example, 3500 grams of molybdenum powder and 5.25 grams of titanium hydride powder were tumbled in a blender for a period of two hours. Such a dry mixing technique is prefered although it is not essential. The mixed material was then compressed to form a self-sustaining compact, using a pressure of 17.5 tons per square inch. The pressed compact can be furnace sintered or sintered in a so-called bottle, wherein a heavy electrical current is passed through the compact while it is maintained in a hydrogen atmosphere. Electrical resistance or so-called bottle sintering has provided the best results and is preferred. By way of further example, the pressed compact, before sintering, had dimensions of 1.062 inch by 1.508 inch by 24 inches. This compact was bottle sintered in a hydrogen atmosphere. The initial sintering current was raised from zero to 1000 amperes through a period of two minutes. The 1000 ampere current was maintained for a period of one minute and thereafter was increased 200 amperes each one-half minute up to a maximum current of 8400 amperes, which is 80% of so-called fusion or melting current. This current of 8400 amperes was maintained for a total period of fifteen minutes. The dimensions of the massive ingot after sintering and with the unsintered ends removed were 0.925 inch by 1.246 inch by 20 1/16 inches. The ingot density was 9.58.

Preparatory to rolling, the foregoing sintered ingot was heated in hydrogen for one hour at a temperature of 1375° C. The heated ingot was cross rolled to a width of two inches using four passes, heating to 1375° C. in hydrogen before each pass. It was then length rolled to a thickness of 0.120 inch using five passes, heating before each pass in hydrogen at temperatures decreasing with successive passes from 1375° C. to 1200° C. At this point the rolled metal was stress relieved by heating in hydrogen for one hour at a temperature of 900° C. Thereafter the metal was immediately length rolled to a thickness of 0.075 inch using four passes, heating to 900° C. between passes. The rolled metal was then cleaned with fused caustic potash and rolled to 0.060 inch using four passes, heating to 900° C. before each pass. The metal was again stress relieved for one hour at 900° C. in a hydrogen atmosphere. If the surface is not already clean, the metal should be caustic cleaned after final rolling. The molybdenum containing the indicated amount of titanium hydride rolled and worked very well with no tendency to crack, split or laminate. It has been found, however, that if the titanium hydride is present in amount greater than 0.4% by weight of the molybdenum, the metal work hardens excessively when being mechanically reduced in thickness and tends to develop defects. In addition, if the titanium hydride is present in amount of less than 0.03% by weight of the molybdenum, the beneficial effects of the titanium hydride in facilitating welding are greatly decreased.

It is necessary to weld molybdenum in a protective atmosphere in order to prevent oxidation. Arc welds with the present molybdenum were excellent and displayed substantially no porosity and reasonable ductility. In general, arc welds made using the present sintered molybdenum were comparable to those obtained when the molybdenum was initially prepared in accordance with the process described in the aforementioned patent to Platte.

The previous welding superiority of the so-called arc cast molybdenum has been attributed to the relatively pure molybdenum which results from the processing and the deliberate addition of deoxidizing agents. In the aforementioned patent to Platte, the process as described enables sintered molybdenum to be readily welded, but it is necessary to wet mix titanium metal with the molybdenum and to vacuum sinter the compact. In addition, powdered titanium metal is difficult to handle. In the present process, the manufacture of the weldable sintered molybdenum is very flexible, inasmuch as dry mixing and hydrogen sintering can be used and titanium hydride is a stable compound. The function of the titanium hydride addition, which enables the sintered molybdenum to be welded readily, is not clearly understood. As one possible explanation, in a hydrogen atmosphere the titanium hydride apparently becomes essentially outgassed at a temperature of around 800° C. to 1000° C. The released hydrogen apparently reacts with any oxygen present in the molybdenum and thus serves as a protecting medium for residual titanium metal, which apparently is retained in the sintered molybdenum either in metal form, or alloy form, or both. After sintering and during working, apparently the molybdenum picks up additional oxygen which is entrapped. This oxygen would impair the continuity of any weld were it not for the presence of titanium metal. Apparently this titanium combines with any residual oxygen during the welding operation to render such oxygen ineffective to impair the quality of the weld. Impurity gas analyses on the sintered material have indicated that there is present some titanium metal which is uncombined with oxygen, and this supports the foregoing explanation.

The present process is subject to considerable variation. As an example, if furnace sintering is desired, it may be used although the so-called bottle sintering is preferred, as indicated hereinbefore. In any sintering operation, the practical minimum sintering temperature has been found to be about 1600° C. The primary purpose of sintering is to form a sintered ingot of sufficient density to enable it to be mechanically worked to the desired configuration without laminating, etc. or otherwise fracturing. In this respect, the present process is conventional. Of course the sintering temperature at no time should exceed the fusion or melting point of the molybdenum ingot. It should be noted that small amounts of impurities, such as carbon, can be tolerated in the present molybdenum.

The foregoing description has considered in detail the arc-welding characteristics of the present sintered molybdenum. It has also been found that the flash-resistance welding and butt-resistance welding characteristics of this molybdenum are very good.

The term massive molybdenum is used herein to describe a sintered coherent mass of this metal, as contrasted to a powdered metal. While the present description has considered in detail massive molybdenum in sheet form, the present molybdenum can also be welded when in rod form, preferably with a flash welding technique.

While a best example of the invention has been described in detail, it is to be particularly understood that the invention is not limited thereto or thereby.

I claim:

1. The method of producing massive molybdenum suitable for welding, which method comprises, forming a substantially even mixture of from 0.03% to 0.4% by weight of finely divided titanium hydride with the balance substantially all finely divided molybdenum powder, compressing said powder mixture to form a self-sustaining compact, sintering said compact in a hydrogen atmosphere to form a sintered ingot which can be mechanically altered in form without fracturing, and thereafter mechanically working said sintered ingot into desired form suitable for use.

2. The method of producing in sheet form molybdenum which is suitable for welding, which method comprises, forming a substantially even mixture of from 0.03% to 0.4% by weight of finely divided titanium hydride with the balance substantially all finely divided molybdenum powder, compressing said powder mixture to form a self-sustaining compact, electrical resistance sintering said compact in a hydrogen atmosphere to form a sintered ingot which can be mechanically altered in form wthout facturing, and thereafter mechanically rolling said sintered ingot into desired sheet form suitable for use.

3. The method of producing in sheet form molybdenum which is suitable for welding, which method comprises, forming a substantially even mixture of from 0.03% to 0.4% by weight of finely divided titanium hydride with the balance substantially all finely divided molybdenum powder, compressing said powder mixture to form a self-sustaining compact, electrical resistance sintering said compact in a hydrogen atmosphere at a temperature of at least about 1600° C. and less than the fusion temperature of said compact to form a sintered ingot which can be mechanically altered in form without fracturing, and thereafter mechanically rolling said sintered ingot into desired sheet form suitable for use.

4. The method of producing in sheet form molybdenum which is suitable for welding, which method comprises, forming a substantially even mixture of about 0.15% by weight of finely divided titanium hydride with the balance substantially all finely divided molybdenum powder, compressing said powder mixture to form a self-sustaining compact, electrical resistance sintering said compact in a hydrogen atmosphere at a temperature of at least about 1600° C. and less than the fusion temperature of said compact to form a sintered ingot which can be mechanically altered in form without fracturing, and thereafter mechanically rolling said sintered ingot under predetermined conditions to form sheet molybdenum suitable for use.

References Cited in the file of this patent

UNITED STATES PATENTS

| | | |
|---|---|---|
| 2,254,549 | Small | Sept. 2, 1941 |
| 2,839,819 | Platte | June 24, 1958 |